W. C. ALLISON.
PIPE COUPLING.
No. 105,290.   Patented July 12, 1870.
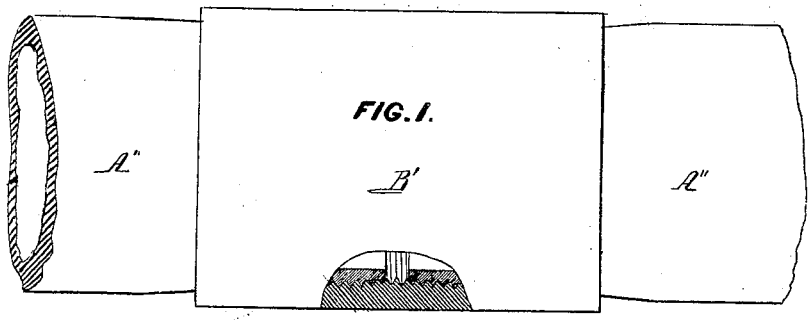
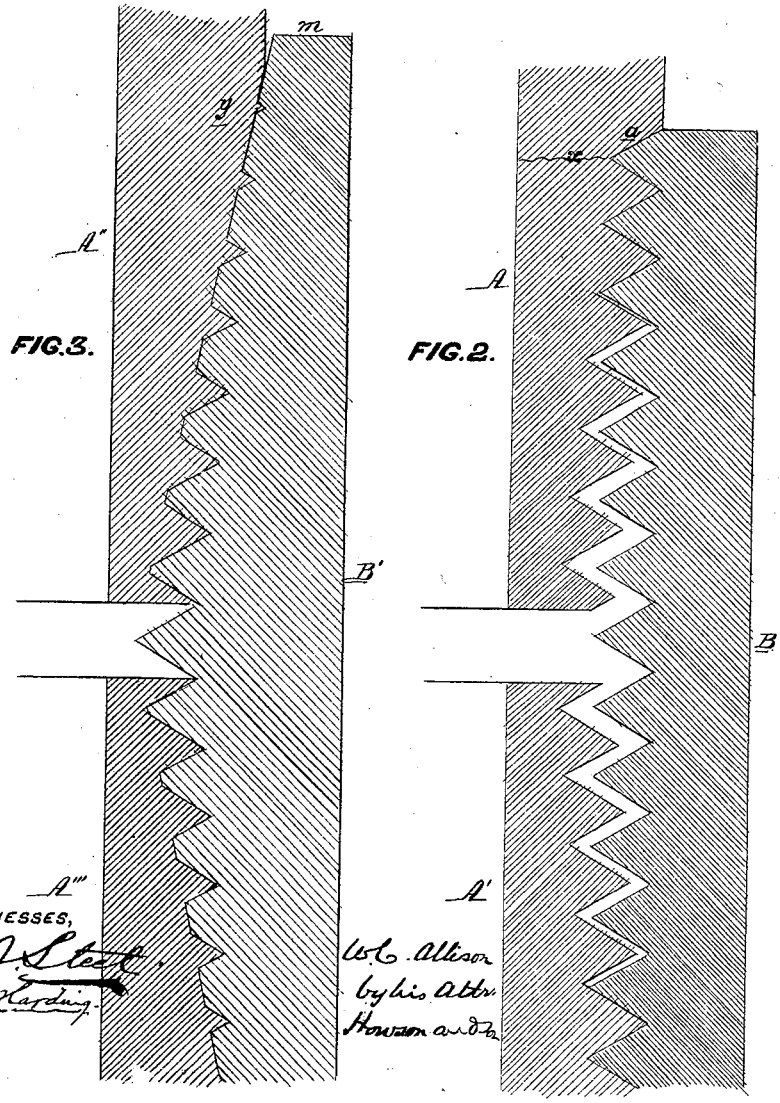

United States Patent Office.

WILLIAM CLARE ALLISON, OF PHILADELPHIA, PENNSYLVANIA.

Letters Patent No. 105,290, dated July 12, 1870.

IMPROVEMENT IN PIPE-COUPLINGS.

The Schedule referred to in these Letters Patent and making part of the same.

I, WILLIAM CLARE ALLISON, of Philadelphia, county of Philadelphia, State of Pennsylvania, have invented an Improvement in Couplings for Tubes, Pipes, Rods, &c., of which the following is a specification.

Nature and Object of the Invention.

My invention consists of a coupling in which tapering and vanishing screw-threads on the ends of the tubes, pipes, or rods to be coupled together, are combined with a socket, having internal vanishing and tapering screw-threads, corresponding to those on the tubes, rods, &c.

The object of my invention is to effect a more perfect and secure junction of tubes, &c., than has been, heretofore, accomplished by screw-couplings, all of which is fully described hereafter.

Description of the Accompanying Drawing.

Figure 1 represents an exterior view, partly in section, of the ends of two pipes coupled together according to my invention.

Figure 2, a diagram illustrating the ordinary mode of coupling pipes together; and Figure 3, a diagram showing the advantages of my invention.

General Description.

In order that my invention may be more readily and thoroughly understood, I will proceed to describe the usual mode of connecting tubes and pipes together, reference being had to the view, fig. 2, which, it should be understood, is exaggerated, to render the defects of the old mode of coupling more apparent.

We will suppose A and A' to represent, on an enlarged scale, sections of parts of the ends of two adjoining wrought-iron tubes, such, for instance, as are used in oil-wells, B being the wrought-iron socket.

It has been usual to cut a slightly tapering screw on the ends of the adjoining tubes, while an internal screw-thread, without any taper, was formed in the socket; hence but a portion of this internal thread of the socket was in proper binding contact with the threads of the pipes, as clearly shown in fig. 2, the greater portion of the threads, both on the tubes and in the socket, being of no avail as mediums for effecting a tight junction of the two tubes. This defect, which is too clearly explained by the diagram, fig. 2, to need further explanation, has been a subject of much complaint, especially in the oil region, where hundreds of feet of tubing are frequently coupled together in the manner described above.

The slightest vibration or jar imparted to such a long tube, composed of lengths thus coupled together and suspended within an oil-well, had a serious effect on these imperfect joints, and frequent leakages occurred, and sometimes the tubes were torn apart and the screw-threads stripped.

There is another, and, perhaps, greater objection than the above to this mode of coupling tubes.

It was customary to cut the threads on the ends of the tubes to a uniform depth throughout the threads, terminating abruptly in a shoulder, $a$, fig. 2, thus forming an incision at $x$, which was the nucleus of an easy fracture at that point, and such fractures frequently occurred in oil-well tubing, the socket B, as it also terminates abruptly at the shoulder $a$, affording no protection against such accidents.

Another objection arising from the abrupt shoulder $a$ was that it prevented the pipe from being screwed into the socket beyond the said shoulder, in order to tighten the pipe when it had become loosened.

In order to obviate these objections I cut on the ends of the pipes A" and A''', fig. 3, a tapering screw. Instead of cutting the thread of this screw to one uniform depth, however, I so cut it that it shall gradually vanish until it disappears at the exterior of the tube, as shown at $y$, fig. 3. It should be understood, however, that the thread of the screw does not vanish so abruptly as is shown in that figure, which is exaggerated, with the view of rendering more apparent the advantages of my invention.

The socket B', fig. 3, instead of having a screw-thread cut through it, as in fig. 2, has two screw-threads, tapering one in one direction, for receiving the end of one tube, and the other in another direction for receiving the end of the other tube, the tapers of each screw corresponding with that of the tube which it has to receive, and the screw-thread vanishes to correspond with the vanishing thread of the tube, as clearly indicated in the drawing.

The advantages of my improvement may be enumerated and described as follows:

First, there is a perfect metallic contact throughout between the socket and the tube, every portion of the thread of one fitting the thread of the other; hence a more perfect and secure joint is made than by the old mode of coupling shown in fig. 2.

Second, no abrupt shoulder, as at $a$, fig. 2, and no incision forming a nucleus for a fracture of the tube, as at $x$, are presented in my improvement, the vanishing screw preventing the formation of such an incision.

Third, the socket in my improvement adds to the strength of the tubes where the joint occurs, whereas, in the old mode, the socket afforded no protection against the fracture of the tube at $x$, fig. 2.

In this connection it may be observed that, in my improvement, the end of the tube may be screwed so far into the socket that the end of the latter will project beyond the end of the vanishing and tapering thread of the screw, as shown at m, fig. 3, and this projecting end of the socket adds to the strength of the joint, which is, in fact, more secure and more proof against tremors and jars than any other part of the tubing.

The use of the tapering and vanishing thread also enables the pipe to be screwed into the socket until it becomes jammed tightly therein, which is another advantage possessed over the ordinary method of coupling, the abrupt shoulder a in the latter preventing the joint from being further tightened after the pipe has been screwed into the socket to that point.

My invention is not confined to the coupling of tubes and pipes alone. It will be evident it might be applied with advantage to the coupling of rods, such as are used in bridges, for instance, or to the coupling of shafting.

Claim.

The rods or tubes A A', having tapering ends and tapering threads upon the same, in combination with a sleeve having tapering sockets and threads corresponding to those on the rods, as set forth.

In testimony whereof I have signed my name to this specification in the presence of two subscribing witnesses.

WILLIAM CLARE ALLISON.

Witnesses:
 WM. A. STEEL,
 FRANK B. RICHARDS.